(12) United States Patent
Niiori et al.

(10) Patent No.: US 6,501,640 B1
(45) Date of Patent: Dec. 31, 2002

(54) ELECTROCHEMICAL CAPACITOR

(75) Inventors: Yusuke Niiori, Inuyama (JP); Hiroyuki Katsukawa, Aichi-prefecture (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 09/649,545

(22) Filed: Aug. 28, 2000

(30) Foreign Application Priority Data

Sep. 13, 1999 (JP) .......................................... 11-259012

(51) Int. Cl.⁷ ................................................ H01M 6/04
(52) U.S. Cl. ........................ 361/504; 361/503; 361/508; 361/523; 361/528; 429/321.8; 429/321.4
(58) Field of Search .............................. 361/504, 503, 361/502, 509, 523, 324, 315, 522, 510, 512; 429/321.8, 321.4

(56) References Cited

U.S. PATENT DOCUMENTS

| | | | |
|---|---|---|---|
| 4,562,511 | * 12/1985 | Nishino et al. | 361/324 |
| 5,874,184 | * 2/1999 | Takeuchi et al. | 429/192 |
| 5,907,472 | * 5/1999 | Farahmandi et al. | 361/502 |
| 6,046,903 | * 4/2000 | Inagawa et al. | 361/502 |
| 6,099,990 | * 8/2000 | Denton, III et al. | 429/231.8 |
| 6,222,723 | * 4/2001 | Razoumov et al. | 361/503 |
| 6,225,733 | * 5/2001 | Gadkaree et al. | 313/352 |
| 6,310,762 | * 10/2001 | Okamura et al. | 361/502 |

OTHER PUBLICATIONS

U.S. patent application Ser. No. 09/473,416, Niiori et al., filed Dec. 29, 1999.
U.S. patent application Ser. No. 09/387,995, Niiori et al., filed Sep. 1, 1999.
U.S. patent application Ser. No. 10/068,484, Niiori et al., filed Feb. 5, 2002.

* cited by examiner

Primary Examiner—Dean A. Reichard
Assistant Examiner—Nguyen Ha
(74) Attorney, Agent, or Firm—Burr & Brown

(57) ABSTRACT

An electrochemical capacitor is provided, including an organic electrolyte solution and polarized electrodes immersed in the organic electrolyte solution. As an active substance of the polarized electrodes, the reaction product of an electrochemical reaction of a partially oxidized carbon material that contains fine crystals of graphite-like carbon in an organic electrolyte solution is used. The electrochemical capacitor has a high electrostatic capacity density based on a pseudo-capacity.

1 Claim, 2 Drawing Sheets

ELECTROCHEMICAL CAPACITOR

BACKGROUND OF THE INVENTION

The present invention relates to an electrochemical capacitor that exhibits a high electrostatic capacity density based on pseudo-capacity by using a carbon material having fine crystals of graphite-like carbon as a polarized electrode material, and by using a reaction product of an electrochemical reaction as an active material.

An electrochemical capacitor (hereafter called "capacitor") is used in a backup power source for electronic devices and in batteries for various transport machines such as motor vehicles because of its large farad-class capacity and excellent charge-discharge cycle characteristics. The use in the storage of electric power at nighttime has also been examined from the viewpoint of effective use of energy.

A single electrode cell 10, one of the basic structures of such a capacitor, generally comprises as FIG. 1 shows, a positive-side polarized electrode 24 and a negative-side polarized electrode 26 formed on current collectors 20 and 22 consisting of a metal material, respectively. The polarized electrodes 24 and 26 are separated by a separator 28, and are impregnated with an electrolyte solution consisting of a solvent and an electrolyte.

FIG. 2 shows the structure of a single capacitor cell 12, in which a plurality of single electrode cells 10 are electrically connected in parallel by electrode extensions 30 and 32 formed on current collectors 20 and 22. Such a single capacitor cell 12 is suitably used in a capacitor of a relatively large capacity used for motor vehicles and the like. These single electrode cells 10 and single capacitor cell 12 are both flat plate types, and are characterized in the ease of increasing packing densities and surface areas.

In addition to such a flat-plate type capacitor, there is a winding-type capacitor 70 as FIG. 3 shows. In a winding-type capacitor 70, a wound body 76 fabricated by cylindrically winding a positive electrode sheet 72 comprising a positive-side polarized electrode 24 formed on a current collector 20 and a negative electrode sheet 74 comprising a negative-side polarized electrode 26 formed on a current collector 22 via a separator 28 is used as an electrode body. For example, this wound body 76 is accommodated in a case 78 filled with an electrolyte solution, and the open end of the case 78 is sealed with a seal plate 82 on which electrode terminals 80 are formed, while securing electrical conduction between the electrode sheets 72, 74 and the electrode terminals 80.

As a material of the polarized electrodes for such capacitors, an activated-charcoal-based material that has a specific surface area of 1000 $m^2/g$ or more has been used. The major electrostatic capacity produced in such capacitors using activated charcoal is electric double layer capacity. In this case, the electrostatic capacity density is limited to 20F/cc, and the withstand voltage is limited to about 3 V.

In order to further improve the performance of capacitors, a new material for polarized electrodes that has a high electrostatic capacity is demanded, and a capacitor utilizing pseudo-capacity by a redox reaction of a metal oxide such as ruthenium oxide or a conductive high polymers such as polypyrrole is attracting attention.

However, since capacitors that use metal oxides require expensive materials such as ruthenium, and can use only aqueous electrolyte solutions, the operating voltage cannot be elevated. When a conductive high polymer is used, although the withstand voltage can be elevated because an organic electrolyte solution can be used, chemical synthesis is complicated and expensive, and thick films are difficult to form, making an increase in the capacity difficult.

Considering the above problems, the object of the present invention is to provide a capacitor that exhibits a high electrostatic capacity based on pseudo-capacity, and uses an active substance that can be synthesized at low costs.

SUMMARY OF THE INVENTION

According to the present invention, an electrochemical capacitor is provided, comprising an organic electrolyte solution, and polarized electrodes immersed in the organic electrolyte solution, wherein a reaction product formed by an electrochemical reaction of a carbon material that has partially oxidized fine crystals of graphite-like carbon in the organic electrolyte solution as an active substance of the polarized electrodes.

In the electrochemical capacitor of the present invention, the carbon material is preferably an easily graphitizable carbon material that has been heat-treated in an inert gas atmosphere at a temperature between 500° C. and 1000° C. One of the methods of partial oxidation comprises a heat treatment of the carbon material In the presence of at least one of an alkali metal compound that contains an alkali metal and oxygen in an inert gas atmosphere above the temperature at which a vapor of the alkali metal is generated. Another method of partial oxidation comprises the immersion of the carbon material in an oxidant that forms graphite acid when graphite is immersed therein. Furthermore, heat treatment of the carbon material may be carried out in an oxidizing atmosphere that contains an oxidizing gas at a temperature below the carbonization temperature of the easily graphitizable carbon material.

The electrochemical reaction for generating electrostatic capacity is preferably carried out by immersing an assembly of a sheet-like electrode fabricated using the partially oxidized carbon material, a separator, and a current collector in an organic electrolyte solution to construct a capacitor, and then passing an electric current through the capacitor. In this case, the electrolyte solution used for carrying out the electrochemical reaction may be different from the electrolyte solution that acts as a capacitor.

DETAILED DESCRIPTION OF THE INVENTION

The electrochemical capacitor (capacitor) of the present invention comprises an organic electrolyte solution, and polarized electrodes immersed in the organic electrolyte solution. In the production of a carbon material that is a major material for the polarized electrodes, an easily graphitizable carbon material, such as petroleum coke, coal coke, petroleum pitch (tar), coal pitch (tar), meso-phase carbon, polyvinyl chloride, and polyimide, is carbonized by heat treatment. This carbonization is suitably carried out in an inert gas atmosphere in a temperature range between about 500° C. and 1000° C. These easily graphitizable carbon materials may be used alone, or in combination of a plurality of such materials. The inert gas is preferably a rare gas such as nitrogen, argon, or helium gas.

Figure 4:
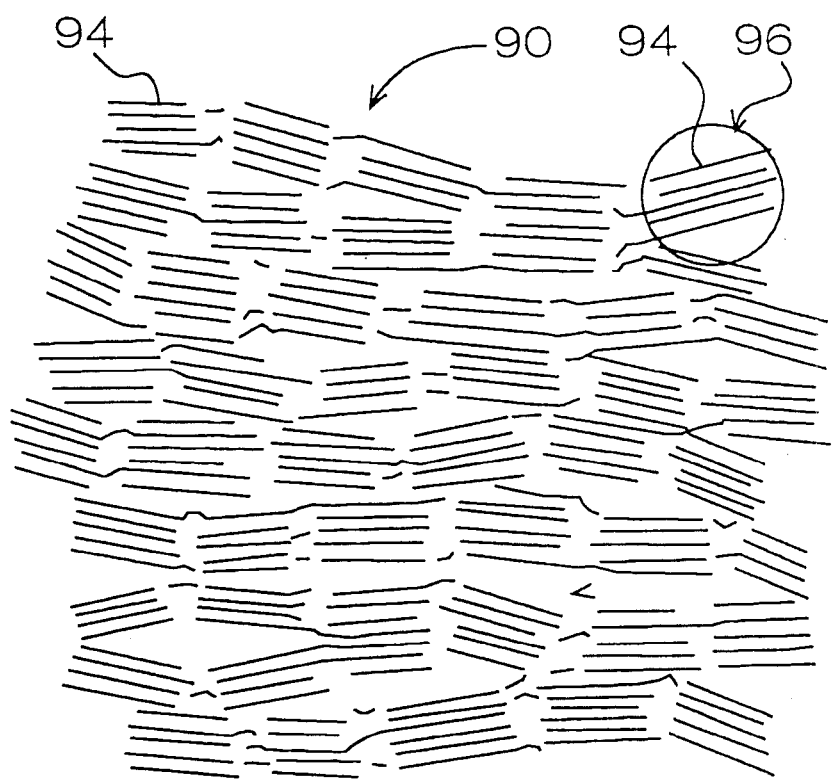
FIG. 4 is an explanatory diagram schematically showing the microstructure of a carbon material preferably used in an electrochemical capacitor of the present invention.

FIG. 4 shows an explanatory diagram of the microstructure of a thus obtained carbon material 90. The carbon material 90 is mainly composed of structures 96 consisting of laminated layers of fine crystals of graphite-like carbon 94. (The network plane of the fine crystals of graphite-like carbon 94 is vertical to the diagram). Although each structure 96 itself is a structure in which fine carbon crystals 94 are laminated substantially in parallel at a substantially equal distance, the structures 96 are oriented almost in parallel, but not perfectly in parallel, and are stuck at irregular angles.

Next, the resultant carbon material is preferably ground to have a predetermined particle size. If the carbon material is available in a powder form, for the reason that the easily graphitizable carbon material is in a powder form, the grinding treatment is not necessarily required. By this grinding treatment, the uniformity of the partially oxidizing reaction and the reduction of treating time in the next step can be achieved. In this grinding treatment, any known methods, either dry or wet process, may be used.

Next, the carbon material is partially oxidized. One of the methods for partial oxidation is the heat treatment of the carbon material in the presence of at least one of alkali metal compounds that contain an alkali metal and oxygen (hereafter called "alkali metal compounds"), in an inert gas atmosphere above the temperature at which the vapor of the alkali metal is generated.

Here oxides, hydroxides, nitrates sulfates, or carbonates containing alkali metal elements such as potassium, sodium, lithium, or rubidium as the alkali metal element may be used, as the alkali metal compounds. The examples include potassium hydroxide, sodium hydroxid, potassium carbonate, and sodium carbonate. The combination of a plurality of these alkali metal compounds may also be used.

The term "in the presence of an alkali metal compound" means the state in which the carbon material is directly mixed with an alkali metal compound, or the state in which the carbon material is placed in an atmosphere contacting with the vapor of the alkali metal generated from the alkali metal compound. The term "the treatment above the temperature at which the vapor of the alkali metal is generated" means the treatment by heating the carbon material in the presence of an alkali metal compound to the temperature at which the vapor of the alkali metal is generated. This heat treatment is carried out in an inert gas atmosphere.

As described above, since the carbon material heat-treated in the presence of an alkali metal compound and partially oxidized contains the unnecessary alkali metal compound adhered to the carbon material, it must be removed. Therefore, the unnecessary alkali metal compound adhered to the carbon material is dissolved in an alcohol-based solvent such as methanol and ethanol, or in distilled water, and the carbon material is washed and filtered. Thus, the carbon material used in the polarized electrodes is obtained.

Another method for the partial oxidation of the carbon material is the heat treatment of the carbon material in an oxidizing atmosphere containing an oxidizing gas at a temperature below the carbonizing temperature of the easily graphitizable carbon material. The oxidizing gases include oxygen, $No_x$, $CO_x$, water vapor, and air. By controlling the partial pressure and oxidizing temperature of these gases, the carbon material can be partially oxidized while inhibiting the extreme oxidation, i.e. combustion, of the carbon material.

A further method for the partial oxidation of the carbon material is a method in which the carbon material is immersed in an oxidant, which forms graphite acid to dissolve graphite when graphite is immersed therein, for oxidation. The oxidants include a mixture of hot nitric acid and potassium chlorate ($KClO_3$), a mixture of hot nitric acid and potassium perchlorate ($HClO_4$), and a mixed acid of hot nitric acid and hot sulfuric acid. Controlling temperature and immersing time can achieve partial oxidation.

Using a thus-formed carbon material as a major material, a polarized electrode can be fabricated. To fabricate the polarized electrode, an organic binder and a conductive agent such as carbon black, are added and mixed in the carbon material. The mixture is kneaded and processed into various forms, such as a plate or a sheet. If the polarized electrode is formed as a sheet, a high capacitor performance can be obtained.

Figure 2:
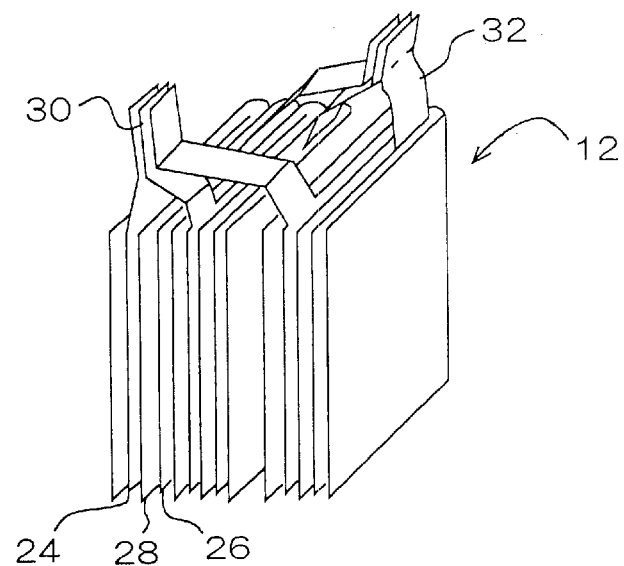
FIG. 2 is a perspective view showing an example of the structure of a single capacitor cell.
Figure 3:
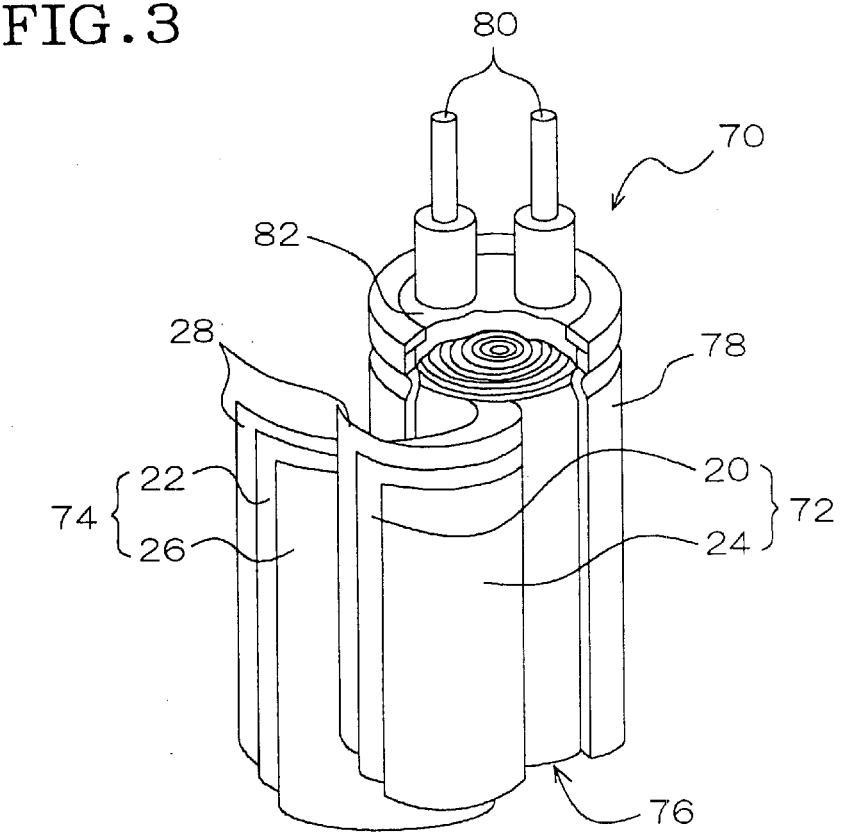
FIG. 3 is a perspective view showing an example of the structure of a winding-type electrochemical capacitor.

It is needless to say that the carbon material can be used as the material for the polarized electrode regardless of the structures of capacitors. For example, the polarized eletrode can be used for fabricating capacitors of various structures such as the single electrode cell 10 shown in FIG. 1, the single capacitor cell 12 shown in FIG. 2, or furthermore, the wound body 76 shown in FIG. 3, which is accommodated in a case and is impregnated with an organic electrolyte solution.

Whatever the structure of the capacitor, the same organic electrolyte solution can be employed. The preferable solutes, i.e. the electrolytes, include tetrifluoroborate ($BF_4$) or hexafluorophosphate ($PF_6^-$) of quaternary ammonium $BRF_4$ or $PF_6$ salts of tetraethyl ammonium ($TEA^+$) or tetrabutyl ammonium ($TBA^+$); $BF_4$ or $PF_6$ salts of tiethylmethyl ammonium ($TEMA^+$); $BF_4$ or $PF_6$ salts of quaternary phosphonium salts; $BF_4$ or $PF_6$ salts of tetraethyl phosphonium ($TEP^+$); $BF_4$ or $PF_6$ salts of imidazolium derivatives represented by the general formula,
[Formula 1]

where $R_1$ and $R_2$ are alkyl groups having 1 to 5 carbon atoms that may be the same or different groups; and $BF_4$ or $PF_6$ salts of 1-ethyl-3 methyl imidazolium ($EMI^+$).

The preferable solvents of the electrolyte solution contain at least one of propylene carbonate (PC), γ-butyl lactone (GBL), ethylene carbonate (EC), and sulfolane (SL). A primary solvent containing at least one of PC, GBL, EC, and SL; and a secondary solvent containing at least one of dimethyl carbonate (DMC), ethylmethyl carbonate (EMC), and diethyl carbonate (DEC) may also be used.

Here, the term "primary solvent" means a solvent that has sufficient properties by itself as a solvent for an electrolyte solution; and the term "secondary solvent" means a solvent that has insufficient properties by itself as a solvent for an electrolyte solution, but exhibits properties superior to the primary solvent alone or the secondary solvent alone when combined with the primary solvent. The quantity of the secondary solvent added is not limited to a certain quantity, such as 50% or less.

After the capacitor is constituted by assembling the polarized electrodes that have been formed in a predetermined shape, separators, and current collectors, and immersing them in an organic electrolyte solution, an electric current is passed to conduct an electrochemical reaction. Although the term "constitution of the capacitor" means the fabrication of the capacitor as the product, it is not limited to such meaning but also means to set the members in an environment to operate as a capacitor. Therefore, the polarized electrodes after the electrochemical reaction can be a capacitor product as the polarized electrodes for the capacitor that uses a different organic electrolyte solution.

The electrostatic capacity produced by this electrochemical reaction is characterized by being extremely larger than the electrostatic capacity produced by using activated charcoal, which also has carbon as the main component. In the capacitor of the present invention, therefore, electrostatic capacity is considered to consist mainly of pseudo-capacity based on a redox reaction related to the reaction product of this electrochemical reaction.

That is, the capacitor of the present invention is obviously distinguished from conventional capacitors that utilize electric double layer capacity, and the active substance in the polarized electrodes is actually not a carbon material, but can be considered as a reaction product of an electrochemical reaction. On the contrary, although the capacitor of the present invention has also an electric double layer capacity, its electrostatic capacity characteristics cannot be explained unless the pseudo-capacity related to the reaction product of the electrochemical reaction is considered as the main. Although this reaction product has not been identified, it is estimated that the reaction product is formed by an electrochemical reaction between the organic electrolyte solution and partially oxidized fine crystals of graphite-like carbon on the surface of the structure consisting of partially oxidized fine crystals of graphite-like carbon in the carbon material and/or in the gap between the structures.

As is shown in the embodiment described below, after the above-described electrochemical reaction, and the formation of a substance that contributes to the generation of pseudo-capacity, the capacitor can also be fabricated by replacing the organic electrolyte solution with the other.

Since the optimal organic electrolyte solution to form the substance that contributes to the generation of pseudo-capacity after an electrochemical reaction is not necessarily the same as the electrolyte solution for the optimal operation of the capacitor, a capacitor having a higher capacity can be fabricated by using different electrolyte solutions for the generation of pseudo-capacity and for the operation of the capacitor.

EXAMPLES

Next, examples of the present invention will be described, but it is needless to say that the present invention is not limited to the following examples.

Example 1

Petroleum coke was used as the easily graphitizable carbon material. In a nitrogen atmosphere, 100 g of petroleum coke was heat-treated at 800° C. for about 2 hours, and was cooled to room temperature. The rate of temperature rising was 100° C./hour. The resultant carbon material was ground to an average particle diameter of 27 $\mu$m, 50 g of this ground carbon material was put in an alumina crucible together with 100 g of potassium hydroxide, the mixture was heat-treated in a nitrogen atmosphere at 800° C. for 2 hours, and then cooled. After cooling, unnecessary potassium hydroxide was removed by washing with water, the carbon material powder was separated by filtration, and dried to obtain the powdered carbon material.

To 1 g of the resultant carbon material, 0.1 g of carbon black as a conductive agent and PTFE (polytetrafluoroethylene) as a binder were added, and these materials were mixed, kneaded, and rolled into a sheet of a thickness of 0.5 mm. The polarized electrode sheet thus fabricated was punched to form discs of a diameter of 19 mm, which were used as positive and negative polarized electrodes. An aluminum foil was used as the current collector, and non-woven cloth of fiber glass was used as the separator.

Figure 1:
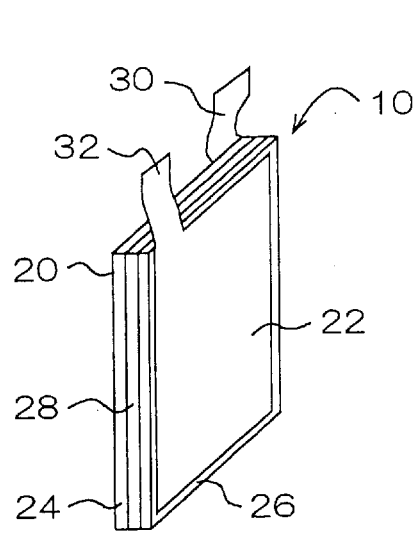
FIG. 1 is a perspective view showing an example of the structure of a single electrode cell.

An electrolyte solution of a concentration of 1 mol/L was prepared using propylene carbonate (PC) as the solvent, and tetraethylammonium tetrafluoroborate (TEABF$_4$) as a solute, and a capacitor (Example 1) that has the equivalent structure as the single electrode cell 10 shown in FIG. 1 was constituted.

This capacitor was fabricated in a glove box of an argon gas atmosphere of a dew point of –80° C. or below. Since the organic electrolyte solution was also used to pass electric current as it is after the completion of the electrochemical reaction, a little excessive quantity of the solution was injected.

To the capacitor of Example 1, a constant current of 5 mA was passed to a voltage of 4 V to conduct the electrochemical reaction, and the substance to be an active substance was synthesized. After constant voltage charging at 4 V for 20 minutes, discharging was performed at a discharging current of 5 mA to obtain the electrostatic capacity density. The capacitor of Example 1 exhibited an electrostatic capacity density of as high as 31 F/cc.

Example 2

In a nitrogen atmosphere, 100 g of meso-phase carbon powder of an average particle diameter of 7 $\mu$m was heat-treated at 780° C. for about 2 hours, cooled to room temperature, and ground. The rate of temperature rising was 100° C./hour. Fifty grams of the resultant powder of the carbon material was heat-treated in air at 500° C. for 2 hours for partial oxidization.

Using the resultant carbon material, a capacitor (Example 2) was fabricated in the same manner as in Example 1. However, in the fabrication of the capacitor of Example 2, a substance to be the active substance was first synthesized using the organic electrolyte solution of a concentration of 1 mol/L consisting of tetraethylammonium tetrafluoroborate (TEABF$_4$) as a solute, and the mixed solvent of 4 parts of sulfolane (SL) and 6 parts of dimethyl carbonate (DMC) as a solvent, and subjected to an electrochemical reaction in the same manner as in Example 1. Next, the organic electrolyte solution used in this electrochemical reaction was removed, and the case was refilled with the organic electrolyte solution of a concentration of 2 mol/L consisting of methylethylpyrrolidinium tetrafluoroborate (MEPYBF$_4$) as a solute, and propylene carbonate (PC) as a solvent for the operation of the capacitor. The result of the measurement in the same manner as in Example 1 showed an electrochemical capacity density of 35 F/cc.

Example 3

In a nitrogen atmosphere, 500 g of polyvinyl chloride (PVC) was heat-treated at 850° C. for about 2 hours, cooled to room temperature, and ground to an average particle diameter of 35 $\mu$m. The rate of temperature rising was 100

C./hour. Next, 10 g of the resultant powder of the carbon material was immersed in a mixed solution of nitric acid, sulfuric acid, and perchloric acid (1:5:5 by volume) at 200° C. for 5 minutes, washed, and dried.

Using the resultant carbon material, a capacitor (Example 3) was fabricated in the same manner as in Example 1. However, in the fabrication of the capacitor of Example 3, the organic electrolyte solution of a concentration of 1 mol/L consisting of γ-butyl lactone (GBL) as a solvent and triethylmethylammonium tetrafluoroborate (TEMABF$_4$) as a solute was used in both the electrochemical reaction and passing an electric current through the capacitor as in the fabrication of the capacitor of Example 1. After the fabricated capacitor of Example 3 was subjected to constant current of 10 mA to a voltage of 4 V and then charged, discharging was performed at a discharging current of 5 mA. The capacitor of Example 3 exhibited an electrostatic capacity density of 28 F/cc.

According to the electrochemical capacitor of the present invention, as described above, a significantly higher electrostatic capacity density can be obtained compared with conventional capacitors using activated charcoal that utilize the generation of an electric double layer capacity, through the use of a substance that can be synthesized by an electrochemical reaction at low costs as the active substance, and by the generation of pseudo-capacity from such a substance. Thus, the present invention has excellent effects such as the reduction of size and weight, the increase of density, and the reduction of manufacturing costs of capacitors.

What is claimed is:

1. An electrochemical capacitor comprising:

a first organic electrolyte solution; and polarized electrodes immersed in said first organic electrolyte solution;

wherein a reaction product formed by an electrochemical reaction of a partially oxidized carbon material that has fine crystals of graphite-like carbon in a second organic electrolyte solution is used as an active substance of said polarized electrodes;

wherein said electrochemical reaction is carried out by immersing an assembly of a sheet-like electrode fabricated using said partially oxidized carbon material, a separator, and a current collector in said second organic electrolyte solution and an electric current is passed therethrough; and wherein said second electrolyte solution used for carrying out said electrochemical reaction differs from said first electrolyte solution.

* * * * *